US 6,621,819 B1

(12) United States Patent
Coppola et al.

(10) Patent No.: US 6,621,819 B1
(45) Date of Patent: Sep. 16, 2003

(54) COMMUNICATION NETWORK FOR TRANSMITTING ATM CELLS OVER A DECT LIKE FRAME

(75) Inventors: Giuseppe Coppola, Monza (IT); Antonio E. Salloum Salazar, Padova (IT)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/277,635

(22) Filed: Mar. 26, 1999

(30) Foreign Application Priority Data

Mar. 26, 1998 (EP) .............................. 98200932

(51) Int. Cl.$^7$ .............................. H04L 12/56; H04J 3/24
(52) U.S. Cl. ................ 370/395.1; 370/395.4; 370/443; 370/474; 455/509
(58) Field of Search ............. 370/395.1, 347, 370/349, 356, 474, 471, 503, 395.4, 395.5, 395.62, 508, 510, 395.63, 397, 443, 479; 714/758, 776, 781, 807, 711, 752, 749; 375/354; 455/503, 509, 510

(56) References Cited

U.S. PATENT DOCUMENTS

| | | | | |
|---|---|---|---|---|
| 5,347,562 A | * | 9/1994 | Candy ........................ 370/280 |
| 5,422,887 A | * | 6/1995 | Diepstraten et al. ........ 448/347 |
| 5,666,366 A | * | 9/1997 | Malek et al. ............... 370/505 |
| 5,717,689 A | * | 2/1998 | Ayanoglu ................... 370/349 |
| 6,014,767 A | * | 1/2000 | Glaise ........................ 714/776 |
| 6,308,078 B1 | * | 10/2001 | Van De Water ............. 455/503 |
| 6,320,869 B1 | * | 11/2001 | Van Driel et al. .......... 370/443 |
| 6,407,993 B1 | * | 6/2002 | Moulsley .................... 370/347 |
| 6,483,830 B1 | * | 11/2002 | Hartikainen et al. ........ 370/349 |
| 6,501,771 B2 | * | 12/2002 | Hoole ......................... 370/479 |

OTHER PUBLICATIONS

ETSI ETS 300 175–2, "Radio Equipment and Systems (RES); Digital European Cordless Telecommunications (DECT) Common Interface, Part 2: Physical Layerr", Oct. 1992, pp. 14–23.

* cited by examiner

Primary Examiner—Alpus H. Hsu
Assistant Examiner—Afsar M Qureshi
(74) Attorney, Agent, or Firm—Daniel J. Piotrowski

(57) ABSTRACT

In a multiple access communication network a primary station (2) is coupled to a plurality of secondary stations (4 . . . 18). The secondary stations (4 . . . 18) transmit packets to the primary station in timeslots in a frame. These timeslots are chosen according to the DECT standard. The problem is that it is not possible to transmit 53 bytes ATM cells in an efficient way in the standard DECT packets.

According to the present invention, the guard space to deal with the differing transmission delays between several secondary stations and the primary station is reduced. To prevent problems due to the above mentioned delay differences, the secondary stations (4 . . . 18) comprise compensation means for adjusting the transmission instants of the packets they transmit. By reducing the guard space, it becomes possible to transmit two 53 bytes ATM cells in a double DECT slot, enabling an efficient transmission of ATM cells over a DECT like frame.

10 Claims, 3 Drawing Sheets

COMMUNICATION NETWORK FOR TRANSMITTING ATM CELLS OVER A DECT LIKE FRAME

BACKGROUND OF THE INVENTION

The present invention is related to a multiple access communication network.

A The invention is also related to a transmitter, a receiver, a transmission method and a signal.

Such a transmission system is known from the ETSI standard ETS 300 175-2, Radio Equipment and Systems (RES); Digital European Cordless Telecommunications (DECT) Common Interface, Part 2: Physical layer, section 4: Physical layer services pp. 14–23.

The DECT standard describes a time domain multiple access communication system in which a plurality of secondary stations can transmit data to a primary station using time slots-with a length of 480 bits. Of these 480 bits, 32 bits are used for synchronisation, and 64 bits are used for control purposes. Furthermore, 60 guard bits are used to prevent collisions between packets from different secondary stations due to differing transmission delays between different secondary stations and the primary station. Consequently 324 bits are available for transmitting payload. If an ATM cell of 53 bytes (=424 bits) should be transmitted, the available 324 bits are insufficient.

It is also possible to use a double slot having 800 bits available for payload transmission. Transmitting an ATM cell in such a double slot uses 424 bits, leaving 376 bits unused. This results in a very inefficient use of the available bandwidth.

The object of the present invention is to provide a communication network according to the preamble in which 53 bytes ATM cell can be transmitted in an efficient way.

To achieve said objective, the present invention is characterized in that the secondary stations comprise packet assembling means for assembling extended length packets comprising two 53 bytes ATM cells, and in that the secondary stations comprise delay compensation means for adjusting their transmission instants to compensate delay differences between different secondary stations and the primary station.

The present invention is based on the recognition that it would be possible to transmit two ATM cells in a double slot without altering the number of overhead bits if the guard space could be reduced to not more than 12 bits. In order to be able to reduce the amount a guard space, delay compensation means should be used.

These delay compensation means are arranged for choosing the instant on which the symbols are transmitted to the primary station in such a way that these symbols arrive at the primary station exactly at the beginning of a timeslot. If the secondary stations use such delay compensation means, the guard time can be substantially reduced, making it possible that two ATM cells can be transmitted in a double slot.

An embodiment of the invention is characterized in that the extended packet comprises a 32 bits synchronization field, a 64 bits control field and a 4 bit crc field.

In this way a packet is obtained having the same construction as a DECT P80 field, except the length of the payload area. This has the advantage that slightly modified DECT equipment can be used in the primary and the secondary stations.

The invention will now be explained with reference to the drawings.

Figure 1:
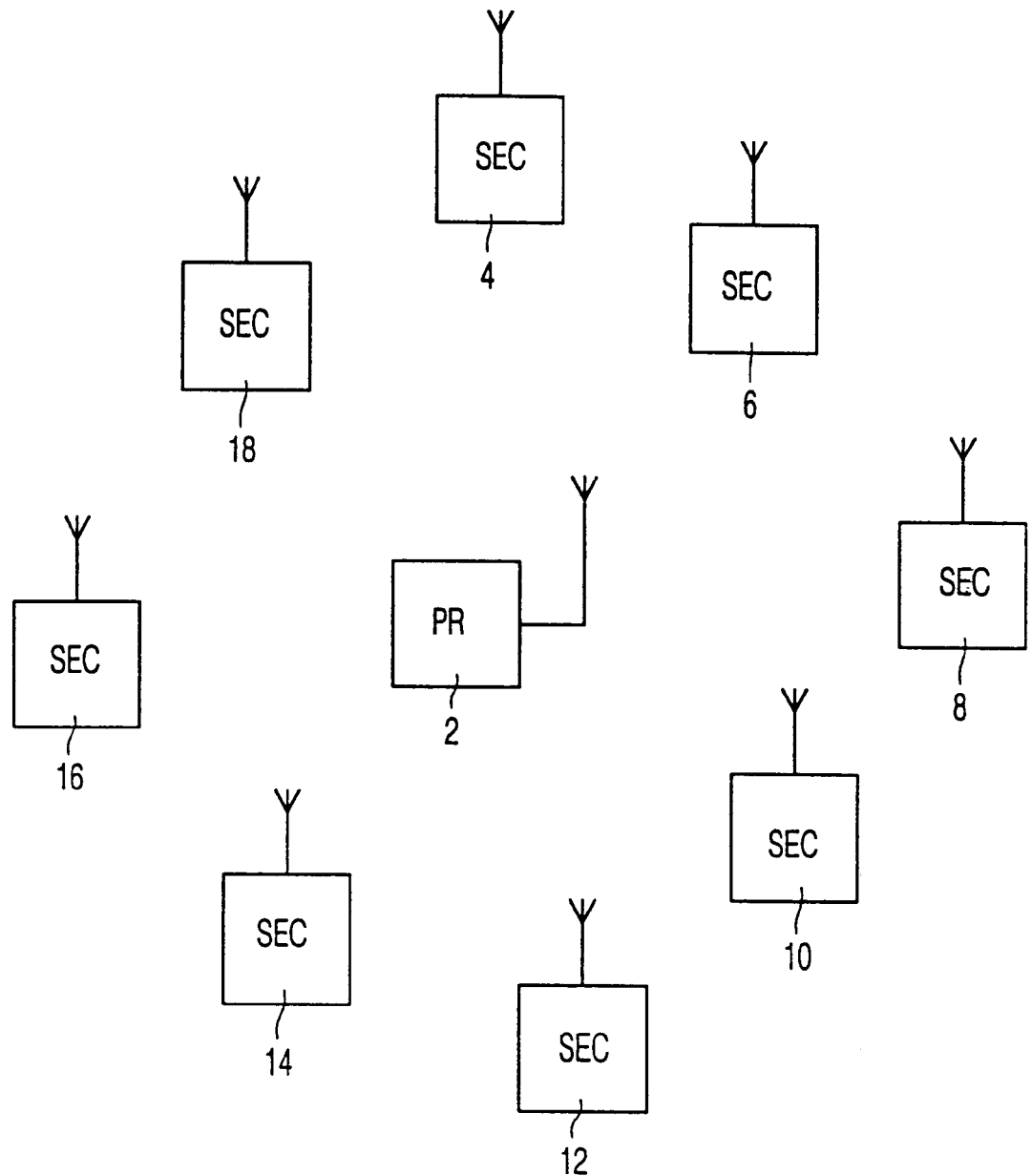
FIG. 1 shows a LMDS communication network in which the present invention can be applied.

In the LMDS (Local Multipoint Distribution System) communication network according to FIG. 1, a primary station 2 is surrounded by a plurality of secondary stations 4 . . . 18. The network according to FIG. 1 is arranged to operate in the 40 GHz band. The primary station 2 uses an omnidirectional antenna in order to be received by all the secondary stations 4 . . . 18. The secondary stations 4 . . . 18 generally use a directional antenna in order to receive a maximum signal level from the primary station 2.

DETAILED DESCRIPTION OF THE PREFERRED EMBODIMENTS

Alternatively, it is also possible to place the primary station on the edge of the area to be served and to use a directional antenna in order to prevent that signals are transmitted outside the area to be served. This alternative reduces the signal transmitted in neighboring cells, resulting in that a given frequency can be reused at a shorter distance than in the system using an omnidirectional antenna.

Figure 2:
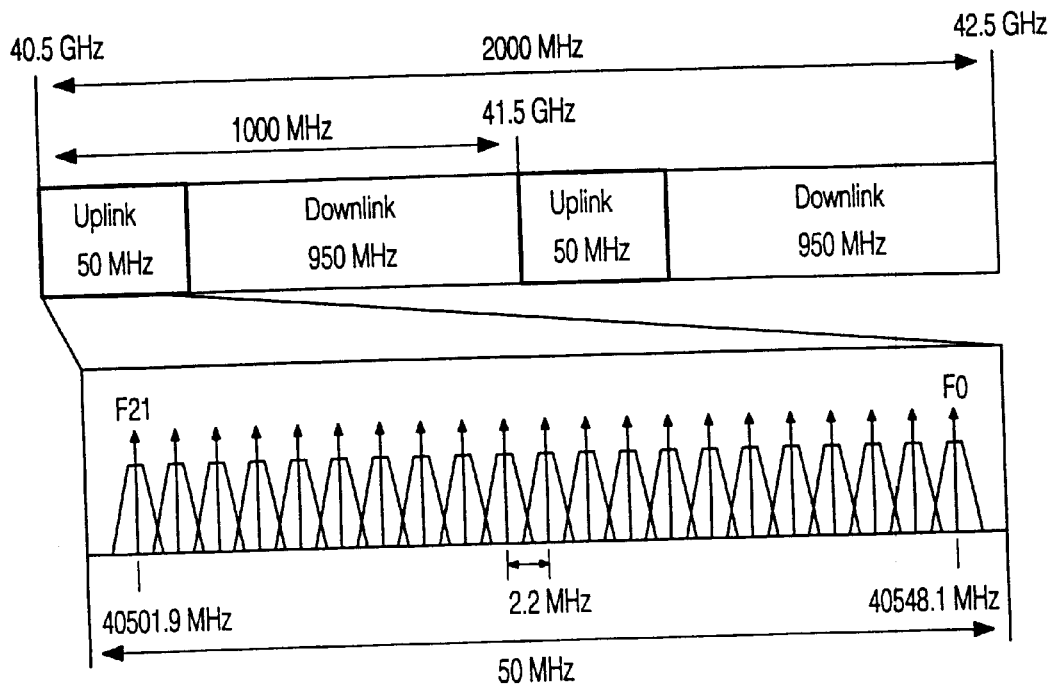
FIG. 2 shows the available frequencies for LMDS transmission in the 40 GHz band.

FIG. 2 shows the frequency bands to be used in the communication network according to the invention. The total frequency band available in Europe for LMDS systems ranges from 40.5 GHz to 42.5 GHz. This frequency band of 2 GHz is split into 2 bands of 1 GHz. Each of the 1 GHz frequency bands is split into an uplink band having a bandwidth of 50 MHz and a downlink frequency band of 950 MHz. The uplink band of 50 MHz comprises 22 carriers having a spacing of 2.2 MHz. Each of these carriers can be GMSK modulated with a bitrate of 1152 kbit/sec. This is the same channel structure as is used in the DECT cordless phone standard.

Figure 3:
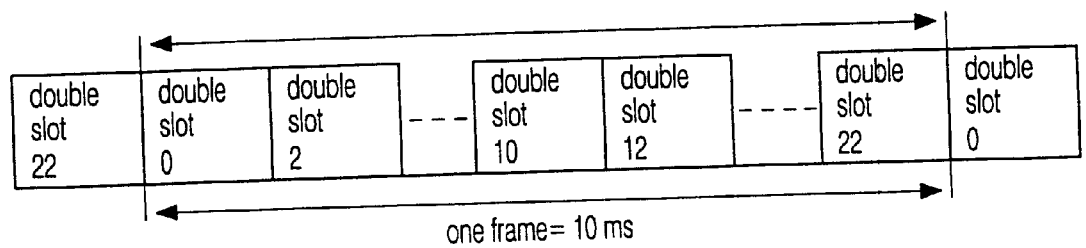
FIG. 3 shows the uplink frame to be used in the transmission system according to the invention.

FIG. 3 shows the uplink frame to be used on each of the 22 carriers according to FIG. 1. The uplink frame has a duration of 10 ms comprising 12 double slots. Each of the double slots can carry 960 bits.

Figure 4:
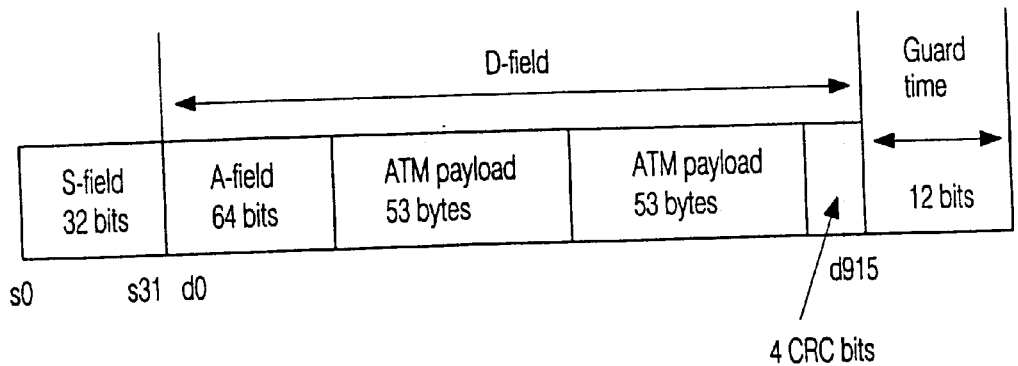
FIG. 4 shows a packet comprising two ATM-cells as is used in the present invention.

FIG. 4 shows the constitution of an uplink packet which can be transmitted in one double slot according to FIG. 3. It starts with a synchronization field S of 32 bits which is followed by a 64 A-field which is used for transmitting control information. After the 64 bit A-field follow two 53 bytes ATM cells carrying payload. After the ATM cells 4 CRC bits are added. These CRC bits are used for determining whether a packet transmitted by a secondary station is received correctly. The final 12 bits of the frame are not used for transmitting data. They are used as guard space to prevent overlapping of two subsequent packets from different secondary stations due to transmission delay differences.

Figure 5:
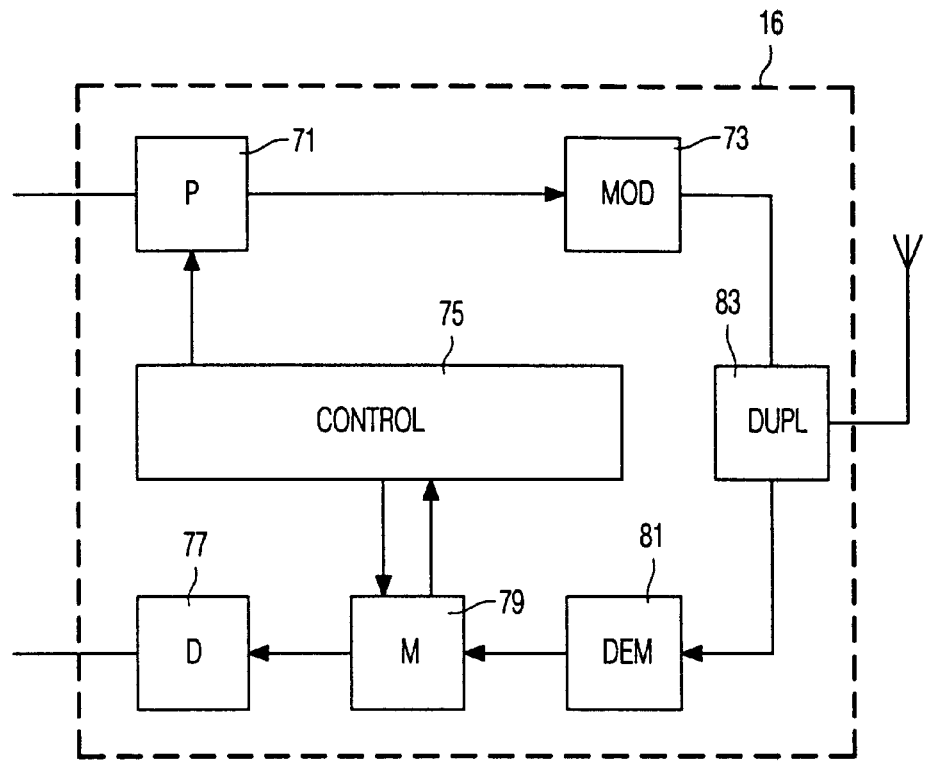
FIG. 5 shows a block diagram of a primary station according to the present invention.

In the primary station according to FIG. 5, the antenna is connected to a terminal of a duplexer 83. An output of the duplexer 83 is connected to an input of a demodulator 81. The output of the demodulator 81 is connected to a measuring unit 79 and to a depacketizer 77.

The measuring unit 79 is arranged for measuring the arrival time of a packet in a time slot as is signaled to the measuring means 79 by a controller 75. The measured arrival time of the packet is compared with the nominal value of the arrival time, and the difference between them is passed to the controller 75. This difference is included in a control message and passed to a packetizer 71 which includes the difference in a packet for the secondary station having transmitted the packet of which the arrival time was measured.

The depacketizer 77 extracts the ATM cells from the received packets, and passes them to its output. ATM cells to be transmitted to one of the secondary stations are applied to an input of a packetizer 71. The packetizer 71 constructs packets according to FIG. 4 for transmission to the secondary stations. The packetizer 71 also constructs packets for transmitting control signals to the secondary stations. The packets constructed by the packetizer 71 are passed to the modulator 73 which modulates its input signal on a carrier for transmission. The output signal of the modulator 73 is passed via the duplexer 83 to the antenna.

Figure 6:
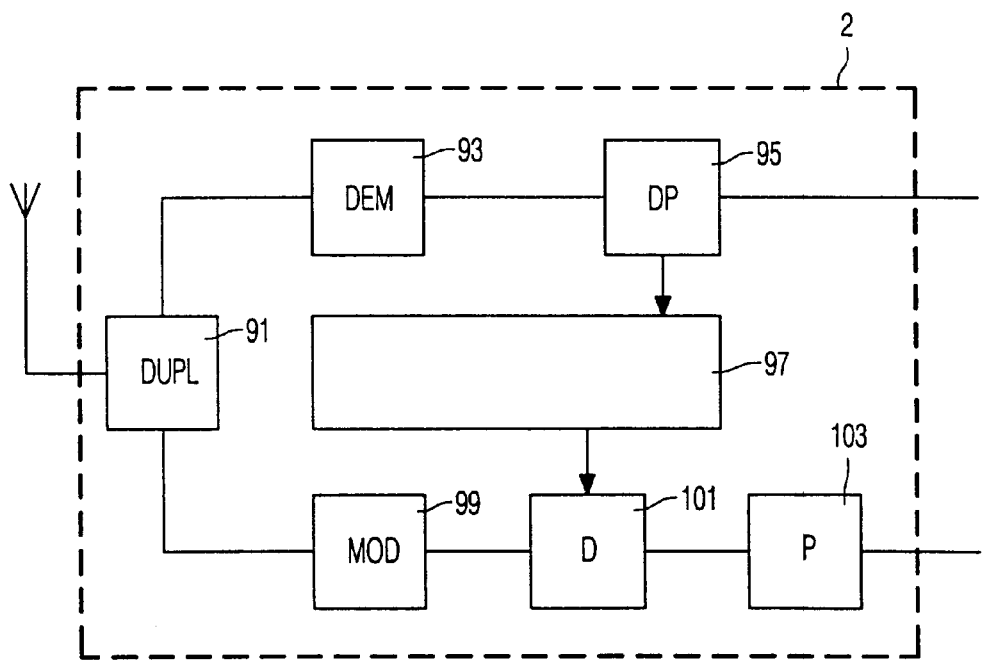
FIG. 6 shows a block diagram of a secondary station according to the present invention.

In the secondary station according to FIG. 6, the antenna is coupled to an input/output of a duplexer 91. An output of the duplexer 91 is connected to an input of a demodulator 93, which demodulates the signal received from the duplexer 91. The output of the demodulator 93 is connected to an input of a depacketizer 95. The depacketizer 95 extracts the ATM cells from its input signal and passes them to its output. The depacketizer 95 extracts also the control messages for the secondary station from its input signal, and passed them to an input of a controller 97. An example of control information is the delay compensation information determined at the primary station.

The ATM cells to be transmitted by the secondary station are applied to an input of a packetizer 103. The packetizer 103 includes the ATM cells into packets according to the format of FIG. 4. The packets from the packetizer 103 are passed to an input of a controllable delay element 101. The controllable delay element 101 receives the delay compensation information received from the primary station, and uses this information to set the delay value such that the arrival time at the primary station of the transmitted packets has the nominal value. The output signal of the controllable delay element 101 is applied to an input of a modulator 99 which modulates the output signal of the controllable delay element 101 on a carrier for transmission to the primary station. The output of the modulator 99 is connected to an input of the duplexer 91 which applies the modulated signal to the antenna for transmitting it to the primary station.

What is claimed is:

1. A multiple access communication network, comprising:
   a primary station coupled to a plurality of secondary stations, the plurality of secondary stations being arranged for transmitting packets comprising a predetermined number of symbol intervals for carrying payload data in corresponding time slots,
   said packets further comprise a plurality of overhead symbols, and said time slots comprising a guard space having no more than 12 bits, wherein the secondary stations comprise packet assembling means for assembling said packets each comprising two ATM cells as payload data, and in that the secondary stations comprise delay compensation means for adjusting a transmission instants to compensate delay difference between secondary stations and the primary stations, in accordance with a size of said guard space having no more than 12 bits.

2. The communication network according to claim 1, wherein said packets each include a synchronization field, a control field and a CRC field.

3. A primary station for multiple access communication, said primary station comprising:
   a receiver for receiving packets comprising a predetermined number of symbol intervals for carrying payload data in corresponding time slots, said packets further comprise a plurality of overhead symbols, and said time slots comprising a guard space having no more than 12 bits, wherein said packets each comprising two ATM cells as payload data, and in that the primary station comprises measuring means for determining a deviation of the arrival time of the packets from a nominal value in accordance with said guard space having no more than 12 bits, the primary station further comprises a transmitter for transmitting delay compensation information derived from the deviation.

4. The primary station according to claim 3, wherein said packets each include a synchronization field, a control field and a CRC field.

5. A secondary station for a multiple access communication network arranged for transmitting packets comprising with a predetermined number of symbol intervals for carrying payload data in corresponding time slots, said packets further comprise a plurality of overhead symbols, and said time slots comprising a guard space having no more than 12 bits,
   wherein the secondary stations comprise packet assembling means for assembling said packets comprising two ATM cells as payload data, and in that the secondary stations comprise delay compensation means for adjusting a transmission instants to compensate delay difference between different secondary stations and the primary stations in accordance with said guard space having no more than 12 bits.

6. The secondary station according to claim 5, wherein said packets each include a synchronization field, a control field and a CRC field.

7. A method for communication between a plurality of secondary stations and a primary station, the method comprising the steps of:
   transmitting packets comprising a predetermined number of symbol intervals for carrying payload data in corresponding time slots by the secondary stations, said packets further comprise a plurality of overhead symbols, and said time slots comprising a guard space having no more than 12 bits;
   assembling said packets comprising two ATM cells as payload data; and
   adjusting the transmission instants of the packets to compensate for a delay difference between secondary stations and the primary stations in accordance with said guard space having no more than 12 bits.

8. A method for transmitting two ATM cells in a double slot without altering a number of overhead bits, said ATM cells being embedded on a carrier comprising a frame of timeslots of a predetermined number of symbols, said frame carrying packets in two subsequent timeslots, said method comprising:
   providing the timeslots comprise a guard space directly behind said packets having no more than 12 bits, and
   adjusting transmission instants of the packets to compensate for a delay due to the size of the guard space before transmitting the frame of timeslots within which the ATM cells are arranged.

9. The method according to claim 8, wherein the packets comprise a synchronization field, a control field and a CRC field.

10. The method according to claim 8, wherein the packets comprise a length of 916 bits including two 53 byte ATM cells, a 32 bit synchronization field, a 64 bit control field and a four bit CRC field.

* * * * *